United States Patent [19]

Grosse

[11] 4,141,798
[45] Feb. 27, 1979

[54] SOLAR STILL

[75] Inventor: Aristid V. Grosse, Haverford, Pa.

[73] Assignee: A. & T. Development Corporation, Philadelphia, Pa.

[21] Appl. No.: 873,721

[22] Filed: Jan. 30, 1978

[51] Int. Cl.² .......................... B01D 3/00; C02B 1/06; F24J 3/02

[52] U.S. Cl. .............................. 202/234; 202/267 R; 47/17; 52/169.13; 203/DIG. 1; 203/DIG. 17; 203/10

[58] Field of Search .................. 203/DIG. 1, 10, 100, 203/86, 99, DIG. 17; 202/234, 267; 47/17, 29, 1 R, 81; 52/169.13; 159/15

[56] References Cited

U.S. PATENT DOCUMENTS

| | | | |
|---|---|---|---|
| 2,807,912 | 10/1957 | Bjorksten | 202/234 |
| 3,006,818 | 10/1961 | Lappala et al. | 202/234 |
| 3,314,862 | 4/1967 | Hay | 202/234 |
| 3,653,150 | 4/1972 | Howard | 47/29 |
| 4,040,216 | 8/1977 | Grosse | 52/169.13 |

Primary Examiner—Wilbur L. Bascomb, Jr.
Attorney, Agent, or Firm—Littlepage, Quaintance, Murphy, Richardson and Webner

[57] ABSTRACT

A solar still includes a pair of parallel dikes separated by a ditch, a first sheet overlying the ditch and pair of parallel dikes, the sheet having a pair of edges arranged substantially parallel to, and outside, the dikes, and a second sheet overlying the first sheet, the second sheet having a pair of edges bonded together with the edges of the first sheet to form a water vapor-impervious seal.

A plurality of vertical columnar supports are periodically positioned in spaced relation between the first and second sheets in the center of the ditch to maintain the second sheet in spaced relation above the first sheet. The second sheet has a ridge coincident with the supports and filamentary members which connect the tops of the supports, and angularly slopes on either side thereof toward the outer edges of the dike. A plurality of spacers are positioned between the first and second sheets periodically along the top of each dike and extending slightly outward therefrom to maintain a spaced relationship between the first and second sheets at the outer edges of the pair of dikes. The joined first and second sheets form a trough on the outside of each dike. This solar still is particularly useful in connection with greenhouse structures employed in desert agriculture as disclosed in U.S. Pat. No. 4,040,216.

11 Claims, 5 Drawing Figures

U.S. Patent Feb. 27, 1979 Sheet 1 of 2 4,141,798
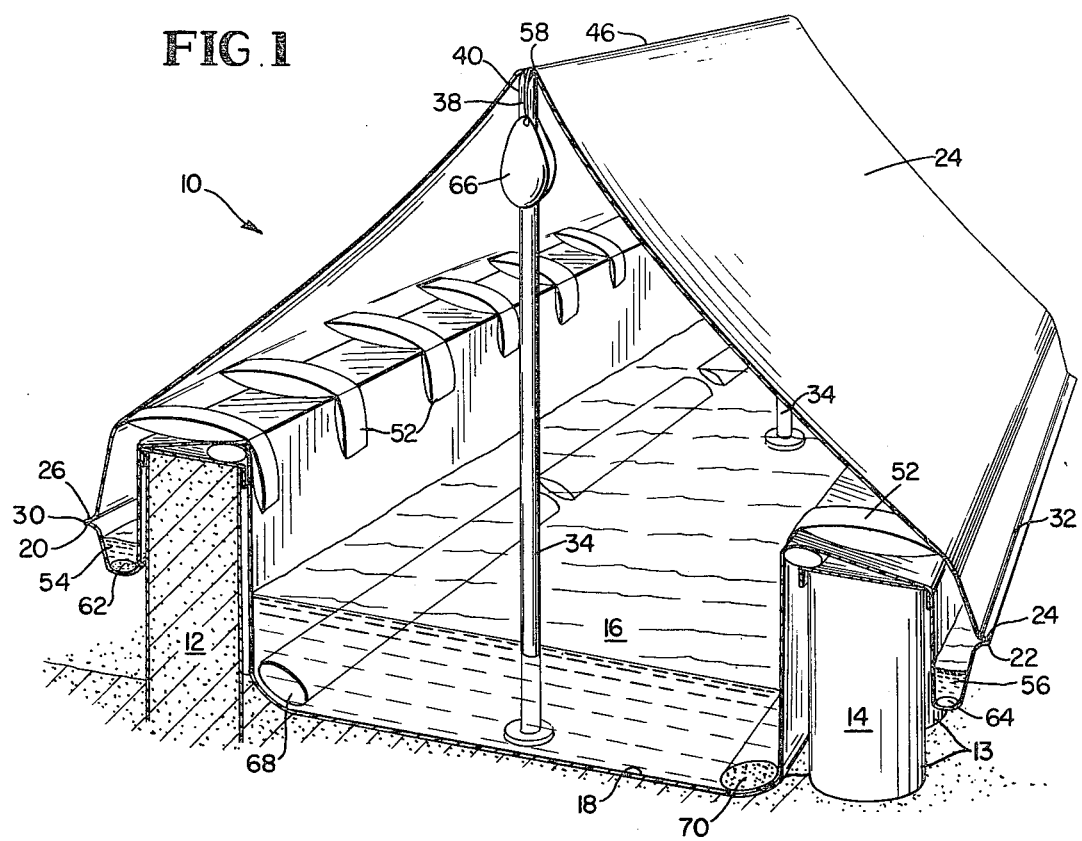

SOLAR STILL

BACKGROUND OF THE INVENTION

1. Field of the Invention

This invention relates to solar stills, and more particularly, to solar stills which can be constructed inexpensively from materials which can be easily transported to the site of the still. This invention has particular utility in dry, sandy regions such as deserts, where construction materials are not readily available and costs of transporting such materials for long distances can become very high. In such regions, the only water naturally available is often either salty or brackish and an inexpensive manner of rendering such water potable is highly desirable. The distillation of the sea water can also be accomplished using this solar still.

2. Description of the Prior Art

The art of producing drinking water from salt water by means of solar distillation is well known, particularly in arid, coastal regions. Many designs of solar stills are known which use conventional construction materials, such as wood, metal, concrete, glass, etc. Typically, a material transparent to solar radiation is supported over a pool of the salt or brackish water in such a manner as to allow the radiant energy to heat and vaporize the water. The vapor thus produced then condenses as the condensate coalesces into a body of potable water. Examples of prior art are to be found in U.S. Pat. Nos. 2,813,063; 3,006,818; 3,336,206; 3,653,150; and 3,191,784.

Since the solar energy used to provide the heat of vaporization of the unpotable water is free, the economy and productivity of a solar still is tied primarily to cost of construction and of material. A common disadvantage of most prior art solar stills has been the necessary importation of bulky and costly structural elements for supporting portions of the solar still.

An additional disadvantage has been the non-utilization of natural materials such as sand or earth found at the site of construction of such a still. Use of such local materials greatly reduces the overall construction cost.

SUMMARY OF THE INVENTION

This invention has as its objective, an improved solar still utilizing structural elements, locally indigenous soil and easily transported metal foil and plastic film. The invention uses column-like pillars or support means as described in Ser. No. 578,931, filed May 19, 1975, now issued as U.S. Pat. No. 4,040,216. These supporting columns or cylinders are of locally indigenous soil enveloped by thin metal foil.

The advantages of a solar still can be readily appreciated by recognizing that the amount of solar energy at the top of the atmosphere is recognized to be about 2.0 calories per square centimeter per minute. About 40 percent of this solar energy is absorbed by the atmosphere as it descends to the surface of the earth. The power level average over a year at the middle latitudes of the United States is about 0.3 calories per square centimeter per minute. In equatorial desert countries, a more likely figure is about 0.45 calories per square centimeter per minute or about 715 kilowatt hours per day per square meter.

The distilled water production of the still is about 0.10 gallons of water/day/sq. ft. of ditch area in winter and about 0.15 gallons of water/day/sq. ft. in summer time. These figures are approximate, and will vary with differences in latitude.

A solar still, such as the one herein described, can be easily constructed in desert regions to make use of the available solar energy to produce purified water in regions where it is otherwise not available.

The solar still can be made of indefinite length or any desired length. The water to be distilled is enclosed between a pair of parallel dikes which are formed of contiguous pillars, as described in U.S. Pat. No. 4,040,216 made from locally indigenous soil encased in metal foil. Two rows of these pillars of indefinite length are placed a suitable distance apart from each other and a sheet of water-impervious, opaque, preferably black, material overlies the ditch formed between the pair of parallel dikes and the dikes on each side of the ditch. The sheet can be made of one or more layers of water-impervious plastic film, one of which layers should preferably be black plastic. The edges of the water-impervious, opaque plastic sheet are arranged parallel to, and outside of the dikes. Vertical columnar supports are positioned periodically in the center of the ditch, midway between the two dikes. Each support is substantially higher than the top of each dike. Each support has a notch in the top thereof which supports filamentary members made of metal wire, rope, nylon, or other suitable material. The second sheet of indefinite length of water vapor-impervious, at least translucent material, overlies the first sheet being supported at its center by the vertical columns and the filamentary members, which run between them. The lower edges of this second sheet fall over the outer side of the dikes and are bonded to the edges of the first sheet, which covers the ditch, the edges bonded together forming a water vapor-impervious seal. The plastic sheets are arranged so that a trough is formed by the first sheet on the outside of the dikes to collect the water, which condenses on the second sheet and runs down to this trough which thus contains the distilled water. The filamentary members which run between the tops of the columnar supports are held in tension by ballast means comprising sealed plastic bags containing locally indigenous soil. These ballast means hang close to the columnar supports at the end of each filamentary member which may be of sufficient length to stretch over the tops of several columnar supports. These bags act as weights and serve to hold the second sheet in the correct spaced relationship to provide a smooth surface upon which the water vapor, having been distilled from the water in the ditch, condenses and runs down into the troughs on the outside of the dikes.

Sealed plastic bags containing locally indigenous soil are used as a plurality of spacing means positioned between the first and second sheets periodically along the top of each dike extending slightly outward therefrom to maintain a spaced relationship between the first and second sheets beyond the outer edges of the pair of dikes, so that the condensed water can run down the second sheet and directly into the trough on the outside of the dike. These spacers are placed sufficiently far apart so that there is adequate clearance between the second sheet and the top of the dikes. The troughs contain sealed bags of locally indigenous soil along their length to maintain a minimum tension on the second sheet to further insure that the second sheet does not touch the top of the dikes. The surface of the second sheet, which faces the first sheet, can be coated with a suitable coating to increase the adherence of the water to enable the condensed water droplets to run down to the trough and not drop off back into the ditch.

It is advantageous that the top of the dikes be sloped downwardly and outwardly toward the troughs so that any water which might accidentally drop from the second sheet onto the top of the dike would run down into the trough. This can be accomplished either by sloping the tops of the pillars themselves and aligning them in such a manner that the first sheet of foil which covers the top of the dike slopes downwardly or outwardly or, perhaps more easily, the pillars which form the dikes are flat-topped and a sealed film, indigenous soil-filled, plastic bag is placed along the tops of adjacent pillars along the inside edge of the row of pillars, that is, along the top edge of the dike nearest to the ditch, thus elevating the top edge of the dike nearest to the ditch so that the first sheet which covers the dikes is made to slope downwardly and outwardly towards the troughs. Similar long, sealed film, soil-filled bags can be used to hold the first sheet in place at the edges of the ditch at the foot of the dikes.

The apparatus can further comprise a pair of third sheets inserted between the first and second sheets, each member of the pair being of indefinite length, preferable similar to the lengths of the first and second sheets, extending from a point just outside the top of a dike angularly upward towards the vertical columnar supports but terminating some distance short of the supports, the upper margins of this pair of third sheets being maintained in position by a second set of filamentary members attached to the upper margin of the third sheets. This second set of filamentary members conveniently take the form of an inverted Y. The vertical leg of the Y is attached to the filamentary members between the vertical columnar supports and the ends of the arms of the Y are attached to the upper margins of the third sheets.

The Y-shaped configuration of the second set of filamentary members can be achieved by directly joining the upper margins of the pair of third sheets with a filamentary member and connecting the midpoint of this filamentary member by another filamentary member to the filamentary member which runs between the tops of the vertical columnar supports. When the correct tension is achieved in the filamentary members, an inverted Y-shaped configuration is attained. This pair of third sheets should also slope downwardly and outwardly to the top of the dikes. This pair of third sheets catches condensed water, which may drop from the second sheet before reaching the dikes and prevents it from dropping back into the undistilled water in the ditch, allowing it to flow directly into the troughs of distilled water.

The preferred material for enclosing the soil-filled bags is polyethylene film; the preferred material for the first sheet is at least one sheet of black polyethylene film with at least one film of transparent polyethylene film bonded thereto. The preferred material for the second and third sheets is at least translucent, perhaps transparent, polyethylene film, the material of the third sheet being thinner than that of the second sheet. These polyethylene films may be heat-sealed, where necessary, by any practicable means such as a heating iron or any other means capable of reaching the melting point of plastic, or they may be sealed with adhesive tape.

The solar still structure should be closed at each end to maximize the distillation rate. A preferred closing is a flap-like embodiment, similar to tent flaps, sealed with a zip fastener, VELCRO, or other suitable fastening which enables ready access to the inside of the still.

The fresh water distilled into the troughs can be emptied by any appropriate means.

If it is desired, and preferably if there is an abundant supply of water to be distilled, the solar still may be built with a slight incline enabling the water to flow from one end of the still to the other. This facilitates any necessary cleaning or washing out of the still. If the still is thus inclined, it may be necessary to install additional ballast means in various places across the floor of the still to direct and control the water flow. These additional ballast means can suitably be made of indigenous soil encased in metal foil or plastic sheeting.

The invention is further described by reference to the figures as follows.

BRIEF DESCRIPTION OF THE DRAWINGS

FIG. 1 is a perspective view of an embodiment of the invention.

FIG. 2 is an enlarged detail of part of FIG. 1.

DETAILED DESCRIPTION OF THE DRAWINGS

Figure 3:
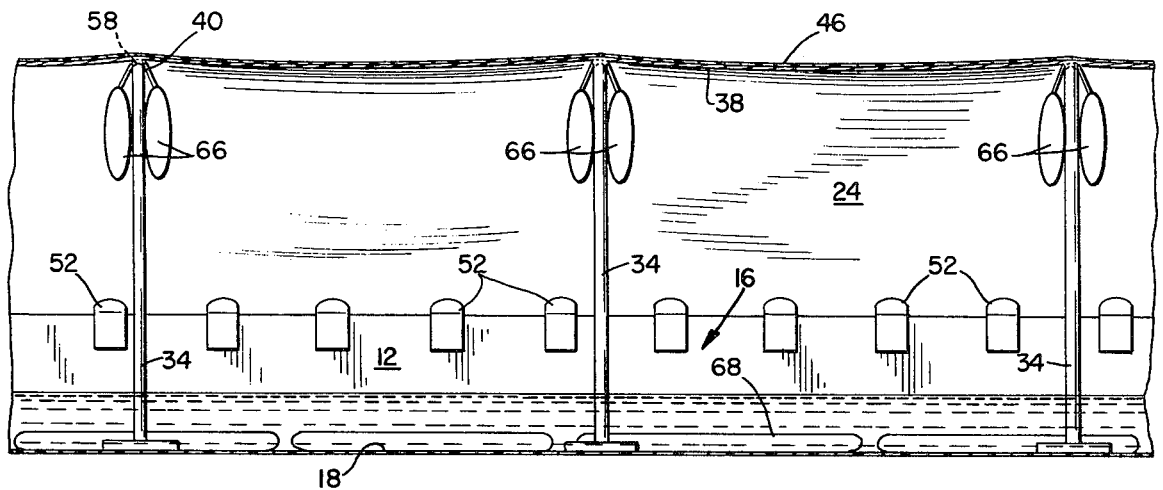
FIG. 3 is another perspective view of an embodiment of the invention.

A solar still 10 of the present invention comprises a pair of parallel dikes 12, 14, made of locally indigenous soil, preferably in the form of pillars 13 such as described in U.S. Pat. No. 4,040,216, of indefinite lengths separated by a ditch 16, a first sheet 18 of indefinite length consisting of a water-impervious, opaque, preferably black, material overlying the ditch 16 and a pair of parallel dikes 12,14, the sheet having a pair of edges 20,22 arranged substantially parallel to, and outside of, the dikes, 12,14. A second sheet 24 of indefinite length consists of a water vapor-impervious, at least translucent, and preferably transparent, material overlying the first sheet 18, the second sheet 24 having a pair of edges 26,28 arranged coincidentally with said pair of edges 20,22 of the first sheet 18, the respective edges of the first and second sheet being bonded together to form water vapor-impervious seals 30,32. A plurality of vertical columnar supports 34 periodically positioned in spaced relationship between the first and second sheets in the center of the ditch 16, each support 34 extending a substantial distance above the top of the adjacent dikes 12,14 and having a notch 58 in the top thereof for receiving filamentary members 38. A plurality of filamentary members 38 extend between the tops of adjacent pairs of the vertical columnar supports 34, the supports 34 and filamentary members 38 acting in consort to maintain the second sheet 24 in spaced relationship above the first sheet 18, the second sheet 24 having a ridge 46 coincident with the supports 34 and filamentary members 38 and angularly depending on either side thereof toward the outer edges of the dikes 12,14. A plurality of spacing means 52 are positioned between the first and second sheets 18,24 periodically along the top of each dike 12,14 and extend slightly outward therefrom for maintaining a spaced relationship between the first and second sheets 18,24 at the outer edges of the pair of dikes 12,14, the joined first and second sheets forming troughs 54,56 on the outside of each dike 12,14. Each trough 54,56 contains a ballast means 62,64 of indefinite length positioned therein for maintaining a minimum tension on the second sheet 24. Ballast means 66 is attached to the end of filamentary member 38 to maintain the required tension on second sheet 24. Ballast means 68,70 are placed at the foot of dikes 12,14 to maintain first sheet 18 in position.

Referring now to FIG. 2, which shows a typical configuration of the structure around dike 14. Dike 14 has a flat top upon which spacing means 72 allows first sheet 18 to form a downwardly and outwardly sloping surface 74 towards trough 56. Trough 56 and ditch 16 both contain water, trough 56 containing the distilled water and ditch 16 the undistilled water. First sheet 18 overlies dike 14 and spacing means 72, and is held in place by spacing means 70 in the ditch and spacing means 64 in the trough. It is also held in place by spacing means 52 on top of the dike which holds second sheet 24 away from the top of dike 14 to enable the condensed water to run into trough 56. FIG. 2 also shows, in detail, the heat-sealed join between edge 22 of sheet 18 and edge 28 of sheet 24 forming water vapor-impervious seal 32. FIG. 2 further shows a layer of insulation 19 which can optionally be included beneath the first sheet 18 to insulate it from the soil below and thereby permit the water in ditch 16 to achieve a high temperature. The insulation 19 can be any conveniently available material but loose dry earth has proved to be satisfactory so long as a vapor barrier 21 is employed.

FIG. 3 shows another perspective view of an embodiment of the solar still 10. This view shows the arrangment of columnar supports 34 supporting second sheet 24. The top 40 of each column 34 contains a notch 58 which supports a filamentary member 38. Ballast means 66 are attached to the filamentary members 38 at suitable intervals, the ballast means 66 preferably hanging close to at least some of the columns 34, to maintain the tension. Second sheet 24 forms a ridge 46 coincident with filamentary member 38.

Figure 4:
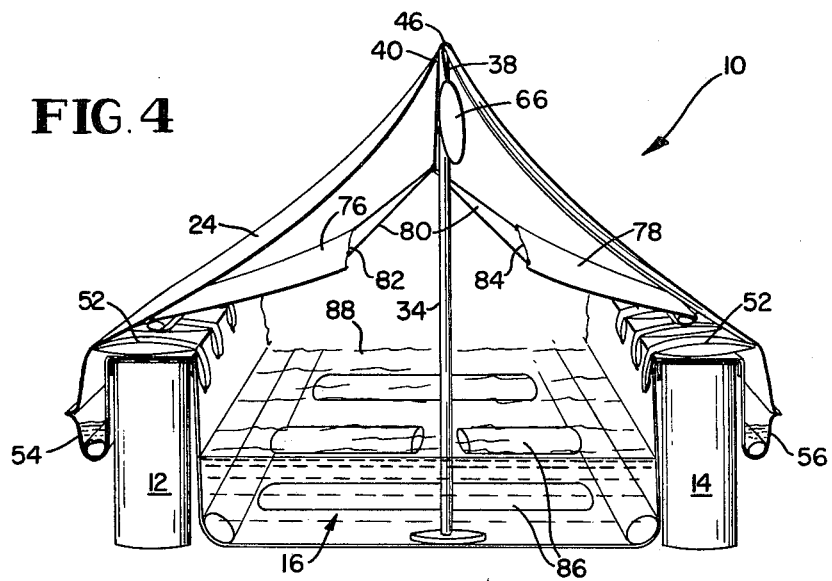
FIG. 4 is a perspective view of another embodiment of the invention.

FIG. 4 shows another embodiment of solar still 10. Third sheet 76, 78 which should preferably be thinner and lighter than second sheet 24 extends from the top of dike 12 sloping upwardly towards ridge 46 but falling substantially short of it. The upper margin 82 of third sheet 76,78 is held in place by filamentary member 80 which is of Y-shaped configuration. Filamentary member 80 is attached at its uppermost point to filamentary member 38. Additional ballast means 86 are placed across ditch 16 as is necessary to control and direct the flow of water 88 when the solar still 10 is built with an incline from one end to the other.

Figure 5:
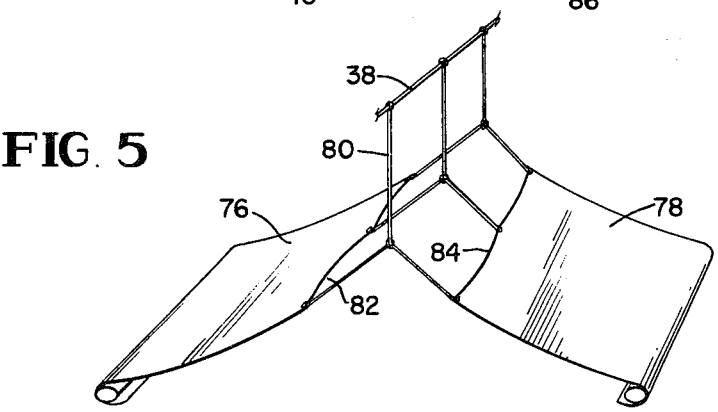
FIG. 5 is a detail of FIG. 4 showing the attachment of the third sheet.

FIG. 5 shows a fragmentary portion of FIG. 4. FIG. 5 shows a pair of third sheets, 76 and 78, whose upper margins 82,84 are held in place by filamentary member 80. Filamentary member 80 is held in Y-shaped configuration.

Although the invention has been described in considerable detail with reference to certain preferred embodiments thereof, it will be understood that variations and modifications can be effected with the spirit and the scope of the invention as described above and as defined in the appended claims.

What is claimed is:

1. A solar still comprising
    a pair of parallel dikes of indefinite length separated by a ditch, a first sheet of indefinite length consisting of a water-impervious, opaque material overlying the ditch and pair of parallel dikes, the sheet having a pair of edges arranged substantially parallel to, and outside of, the dikes, said portion of said sheet overlying said ditch defining a container for holding an impure liquid
    a second sheet of indefinite length consisting of a water vapor-impervious, at least translucent material overlying the first sheet, the second sheet having a pair of edges arranged coincidentally with said pair of edges of the first sheet, the respective edges of the first and second sheet being bonded together to form a water vapor-impervious seal,
    a plurality of vertical columnar supports periodically positioned in spaced relation between the first and second sheets in the center of the ditch, each support extending a substantial distance above the top of the adjacent dikes, and having a notch in the top thereof for receiving filamentary members,
    a plurality of filamentary members extending between the tops of adjacent pairs of the vertical columnar supports, the supports and filamentary members acting in consort to maintain the second sheet in spaced relation above the first sheet, the second sheet having a ridge coincident with the supports and filamentary members and angularly depending on either side thereof toward the outer edges of the dikes, and
    a plurality of spacing means positioned between the first and second sheets periodically along the top of each dike and extending slightly outward therefrom for maintaining a spaced relationship between the first and second sheets at the outer edges of the pair of dikes, the joined first and second sheets forming a trough on the outside of each dike said troughs defining a container for receiving and holding purified distilled liquid.

2. The apparatus of claim 1 wherein each vertical columnar support comprises a pillar made from locally indigenous soil encased in thin, metal foil.

3. The apparatus of claim 1 further comprising ballast means positioned in said troughs for maintaining a minimum tension on said second sheet.

4. The apparatus of claim 1 wherein a major portion of the top of each of said dikes is sloped downwardly outwardly toward the respective adjacent troughs.

5. The apparatus of claim 1 wherein the surface of the second sheet which faces the first sheet further comprises a coating for increasing the adherence of water.

6. The apparatus of claim 1 wherein each of said filamentary members extending between adjacent pairs of vertical columnar supports further includes a ballast member attached to the filamentary member for maintaining the filamentary member in the desired tension state.

7. The apparatus of claim 1 further comprising a pair of third sheets inserted between said first and second sheets, each member of the pair being of indefinite length and extending from a point just outside the top of a dike angularly upward toward the plurality of vertical columnar supports but terminating some distance short of the supports, the upper margins of the pair of third sheets being maintained in position by a second set of filamentary members attached to an upper margin of the third sheets.

8. The apparatus of claim 6 wherein the second set of filamentary members is of inverted Y-shaped configuration.

9. The apparatus of claim 1 wherein each of the pair of parallel dikes comprises a plurality of pillars each pillar consisting of locally indigenous soil encased within a thin, metal foil.

10. The apparatus of claim 1 further comprising a layer of insulation positioned beneath said first sheet.

11. A solar still comprising
   a pair of parallel dikes, each dike comprising a plurality of pillars, the dikes being of indefinite length separated by a ditch, a first sheet of indefinite length consisting of a water-impervious, opaque material overlying the ditch and a pair of parallel dikes, the first sheet having a pair of edges arranged substantially parallel to, and outside of, the dikes, the top of each of said dikes sloping downwardly and outwardly away from said ditch, said portion of said sheet overlying said ditch defining a container for holding an impure liquid,
   a second sheet of indefinite length consisting of a water vapor-impervious, at least translucent material with a coating for reducing the surface tension of water overlying the first sheet, the second sheet having a pair of edges arranged coincidentally with said pair of edges of the first sheet, the respective edges of the first and second sheet being bonded together to form a water vapor-impervious seal,
   a plurality of vertical columnar supports periodically positioned in spaced relation between the first and second sheets in the center of the ditch, each support extending a substantial distance above the top of the adjacent dikes, and having a notch in the top thereof for receiving filamentary members,
   a plurality of filamentary members extending between the tops of adjacent pairs of the vertical columnar supports with ballast means attached to each end of said filamentary members for maintaining the filamentary members in the desired tension state, the supports and filamentary members acting in consort to maintain the second sheet in spaced relation above the first sheet, the second sheet having a ridge coincident with the supports and filamentary members and angularly depending on either side thereof toward the outer edges of the dikes, and
   a plurality of spacing means positioned between the first and second sheets periodically along the top of each dike and extending slightly outward therefrom for maintaining a spaced relationship between the first and second sheets at the outer edges of the pair of dikes, the joined first and second sheets forming a trough on the outside of each dike, and ballast means within each trough for maintaining a minimum tension on each sheet, said troughs defining a container for receiving and holding purified distilled liquid and
   further comprising a pair of third sheets inserted between said first and second sheets, each member of the pair being of indefinite length and extending from a point just outside the top of a dike angularly upward toward the plurality of vertical columnar supports but terminating some distance short of the supports, the upper margins of the pair of third sheets being maintained in position by a second set of filamentary members attached to an upper margin of the third sheets, said second set of filamentary members being of inverted Y-shaped configuration,
   further comprising a layer of insulation positioned beneath said first sheet.

* * * * *